(12) United States Patent
Ward et al.

(10) Patent No.: US 12,406,077 B2
(45) Date of Patent: Sep. 2, 2025

(54) LOGIC CIRCUITRY PACKAGE FOR PRINT APPARATUS

(71) Applicant: HEWLETT-PACKARD DEVELOPMENT COMPANY, L.P., Spring, TX (US)

(72) Inventors: Jefferson P. Ward, Vancouver, WA (US); Stephen D. Panshin, Corvallis, OR (US); Kyle Michel, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 222 days.

(21) Appl. No.: 17/802,390

(22) PCT Filed: Apr. 30, 2020

(86) PCT No.: PCT/US2020/030860
§ 371 (c)(1),
(2) Date: Aug. 25, 2022

(87) PCT Pub. No.: WO2021/221678
PCT Pub. Date: Nov. 4, 2021

(65) Prior Publication Data
US 2023/0109232 A1    Apr. 6, 2023

(51) Int. Cl.
*G06F 21/60* (2013.01)
*G06F 21/85* (2013.01)
*H04L 9/08* (2006.01)

(52) U.S. Cl.
CPC ............ *G06F 21/608* (2013.01); *G06F 21/85* (2013.01); *H04L 9/088* (2013.01)

(58) Field of Classification Search
CPC .................. G06F 21/608; G06F 21/85; G06F 2221/2103; G06F 21/44; G06F 21/445;
(Continued)

(56) References Cited

U.S. PATENT DOCUMENTS

| 4,074,284 A | 2/1978 | Dexter et al. |
| 4,506,276 A | 3/1985 | Kyser et al. |

(Continued)

FOREIGN PATENT DOCUMENTS

| AU | 2014202104 A1 | 5/2014 |
| CA | 2507422 A1 | 1/2002 |

(Continued)

OTHER PUBLICATIONS

Arnostech, "Thermal Inkjet Printers," retrieved at http://www.amostech.com/machines/coding-systems/thermal-inkjet-printers/, retrieved on Jul. 1, 2019, 3 pages.

(Continued)

*Primary Examiner* — David Garcia Cervetti
(74) *Attorney, Agent, or Firm* — Foley & Lardner LLP

(57) ABSTRACT

A logic circuitry package for a print apparatus includes a serial data bus interface to interface with a serial data bus, the logic circuit to respond to messages from the print apparatus over the serial data bus directed to a number of different addresses using different component keys for cryptographic authentication corresponding to each different address, the different component keys related to at least one master key of the print apparatus. The logic circuitry package further includes control logic which, in response to a session initiation request message on the serial data bus from the print apparatus, is to establish a secure communication session related to one of the different addresses, the control logic to cryptographically authenticate responses to each subsequent message of the secure communication session from the print apparatus using a component key corresponding to the address.

20 Claims, 4 Drawing Sheets

(58) Field of Classification Search
CPC ........ G06F 21/64; G06F 21/72; G06F 3/1238; G06F 13/4282; H04L 9/088; H04L 9/3242

See application file for complete search history.

(56) References Cited

U.S. PATENT DOCUMENTS

| | | | |
|---|---|---|---|
| 4,639,738 A | 1/1987 | Young et al. |
| 4,734,787 A | 3/1988 | Hayashi |
| 5,001,596 A | 3/1991 | Hart |
| 5,045,811 A | 9/1991 | Lewis |
| 5,079,570 A | 1/1992 | Mohr et al. |
| 5,142,909 A | 9/1992 | Baughman |
| 5,329,254 A | 7/1994 | Takano |
| 5,438,351 A | 8/1995 | Trenchard et al. |
| 5,471,176 A | 11/1995 | Henson et al. |
| 5,561,691 A | 10/1996 | Weinraub |
| 5,583,544 A | 12/1996 | Stamer et al. |
| 5,680,960 A | 10/1997 | Keyes et al. |
| 5,682,184 A | 10/1997 | Stephany et al. |
| 5,699,091 A | 12/1997 | Bullock et al. |
| 5,731,824 A | 3/1998 | Kneezel et al. |
| 5,751,323 A | 5/1998 | Swanson et al. |
| 5,757,406 A | 5/1998 | Kaplinsky et al. |
| 5,777,646 A | 7/1998 | Barinaga et al. |
| 5,788,388 A | 8/1998 | Cowger et al. |
| 5,861,780 A | 1/1999 | Fukuda |
| 5,975,688 A | 11/1999 | Kanaya et al. |
| 6,068,363 A | 5/2000 | Saito |
| 6,098,457 A | 8/2000 | Poole |
| 6,151,039 A | 11/2000 | Hmelar et al. |
| 6,164,766 A | 12/2000 | Erickson |
| 6,175,929 B1 | 1/2001 | Hsu et al. |
| 6,219,933 B1 | 4/2001 | Taniguchi et al. |
| 6,299,273 B1 | 10/2001 | Anderson et al. |
| 6,312,074 B1 | 11/2001 | Walker |
| 6,341,853 B1 | 1/2002 | Scheffelin et al. |
| 6,386,693 B1 | 5/2002 | Michele et al. |
| 6,402,299 B1 | 6/2002 | Demeerleer et al. |
| 6,412,901 B2 | 7/2002 | Su et al. |
| 6,431,670 B1 | 8/2002 | Schantz et al. |
| 6,456,802 B1 | 9/2002 | Phillips |
| 6,457,355 B1 | 10/2002 | Philipp |
| 6,494,553 B1 | 12/2002 | Donahue et al. |
| 6,494,568 B2 | 12/2002 | Hou et al. |
| 6,598,963 B1 | 7/2003 | Yamamoto et al. |
| 6,641,240 B2 | 11/2003 | Hsu et al. |
| 6,641,243 B2 | 11/2003 | Anderson et al. |
| 6,648,434 B2 | 11/2003 | Walker et al. |
| 6,685,290 B1 | 2/2004 | Farr et al. |
| 6,736,497 B2 | 5/2004 | Jung |
| 6,796,644 B1 | 9/2004 | Anderson et al. |
| 6,802,581 B2 | 10/2004 | Hasseler et al. |
| 6,802,602 B2 | 10/2004 | Sakai et al. |
| 6,811,250 B2 | 11/2004 | Buchanan et al. |
| 6,902,256 B2 | 6/2005 | Anderson et al. |
| 6,908,179 B2 | 6/2005 | Pan et al. |
| 6,959,599 B2 | 11/2005 | Feldstein et al. |
| 6,966,222 B2 | 11/2005 | Carlson et al. |
| 6,969,137 B2 | 11/2005 | Maeda |
| 7,039,734 B2 | 5/2006 | Sun et al. |
| 7,077,506 B2 | 7/2006 | Chen |
| 7,171,323 B2 | 1/2007 | Shipton et al. |
| 7,240,130 B2 | 7/2007 | Larson et al. |
| 7,260,662 B2 | 8/2007 | Moriwaki et al. |
| 7,328,115 B2 | 2/2008 | Shipton et al. |
| 7,380,042 B2 | 5/2008 | Wang et al. |
| 7,458,656 B2 | 12/2008 | Smith |
| 7,533,960 B2 | 5/2009 | Yasuda et al. |
| 7,547,082 B2 | 6/2009 | Lee et al. |
| 7,630,304 B2 | 12/2009 | Larson et al. |
| 7,631,190 B2 * | 12/2009 | Walmsley ............ H04L 9/3247 713/176 |
| 7,686,423 B2 | 3/2010 | Sato et al. |
| 7,740,347 B2 | 6/2010 | Silverbrook et al. |
| 7,775,638 B2 | 8/2010 | Hirosawa et al. |
| 7,802,857 B2 | 9/2010 | Satoru |
| 7,841,712 B2 | 11/2010 | Muyskens et al. |
| 7,886,197 B2 | 2/2011 | Wegman |
| 7,890,690 B2 | 2/2011 | Naderi et al. |
| 7,970,042 B2 | 6/2011 | Hardin et al. |
| 8,040,215 B2 | 10/2011 | Zakriti |
| 8,161,224 B2 | 4/2012 | Laurencin et al. |
| 8,215,018 B2 | 7/2012 | Morita et al. |
| 8,220,910 B2 | 7/2012 | Wanibe |
| 8,224,602 B2 | 7/2012 | Lory et al. |
| 8,289,788 B2 | 10/2012 | Asauchi |
| 8,331,581 B2 | 12/2012 | Pennock |
| 8,348,377 B2 | 1/2013 | Asauchi |
| 8,350,628 B1 | 1/2013 | Bennett |
| 8,364,859 B2 | 1/2013 | Sato |
| 8,386,657 B2 | 2/2013 | Adkins et al. |
| 8,393,718 B2 | 3/2013 | Kida et al. |
| 8,393,721 B2 | 3/2013 | Katoh et al. |
| 8,429,437 B2 | 4/2013 | Asauchi |
| 8,432,421 B2 | 4/2013 | Muraki et al. |
| 8,438,919 B2 | 5/2013 | Phillips et al. |
| 8,454,137 B2 | 6/2013 | Price et al. |
| 8,556,394 B2 | 10/2013 | Chen et al. |
| 8,558,577 B1 | 10/2013 | Soriano et al. |
| 8,562,091 B2 | 10/2013 | Sabanovic et al. |
| 8,591,012 B2 | 11/2013 | Yoshino et al. |
| 8,608,276 B2 | 12/2013 | Oohashi et al. |
| 8,621,116 B2 | 12/2013 | Fister et al. |
| 8,635,455 B2 * | 1/2014 | Starr ............... H04L 9/0897 713/193 |
| 8,651,614 B2 | 2/2014 | Sakamoto et al. |
| 8,651,643 B2 | 2/2014 | Harvey et al. |
| 8,721,059 B2 | 5/2014 | Kodama et al. |
| 8,721,203 B2 | 5/2014 | Ehrhardt, Jr. |
| 8,752,943 B2 | 6/2014 | Hirano et al. |
| 8,850,079 B2 * | 9/2014 | Fister ............... G06F 13/364 399/24 |
| 8,864,277 B2 | 10/2014 | Rice et al. |
| 8,876,257 B2 | 11/2014 | Harada et al. |
| 8,888,207 B2 | 11/2014 | Furness et al. |
| 8,892,798 B2 | 11/2014 | Tailliet et al. |
| 8,898,358 B2 | 11/2014 | Decesaris et al. |
| 8,978,487 B2 | 3/2015 | Fergusson et al. |
| 8,990,467 B2 | 3/2015 | Saito |
| 9,079,414 B2 | 7/2015 | Lester et al. |
| 9,108,448 B1 | 8/2015 | Bergstedt |
| 9,132,656 B2 | 9/2015 | Nicholson et al. |
| 9,137,093 B1 | 9/2015 | Abraham et al. |
| 9,176,921 B2 | 11/2015 | Fister et al. |
| 9,194,734 B2 | 11/2015 | Mehrer et al. |
| 9,213,396 B1 | 12/2015 | Booth et al. |
| 9,213,927 B1 | 12/2015 | Ahne |
| 9,254,661 B2 | 2/2016 | Otaka et al. |
| 9,298,908 B1 | 3/2016 | Booth et al. |
| 9,370,934 B2 | 6/2016 | Asauchi et al. |
| 9,400,204 B2 | 7/2016 | Schoenberg |
| 9,413,356 B1 | 8/2016 | McKinley |
| 9,413,359 B2 | 8/2016 | Stirk |
| 9,454,504 B2 | 9/2016 | Evans |
| 9,483,003 B2 | 11/2016 | Thacker, III |
| 9,487,017 B2 | 11/2016 | Ge et al. |
| 9,496,884 B1 | 11/2016 | Azenkot et al. |
| 9,511,596 B2 | 12/2016 | Anderson et al. |
| 9,561,662 B2 | 2/2017 | Ward et al. |
| 9,582,443 B1 | 2/2017 | Switzer et al. |
| 9,599,500 B2 | 3/2017 | Ge et al. |
| 9,619,663 B2 * | 4/2017 | Refstrup ............ G03G 15/0863 |
| 9,671,820 B2 | 6/2017 | Maruyama et al. |
| 9,734,121 B2 | 8/2017 | Pitigoi-Aron et al. |
| 9,738,087 B2 | 8/2017 | Kato et al. |
| 9,746,799 B2 | 8/2017 | Jeran |
| 9,770,914 B2 | 9/2017 | Harvey et al. |
| 9,776,412 B2 | 10/2017 | Ge et al. |
| 9,789,697 B1 | 10/2017 | Knierim et al. |
| 9,796,178 B2 | 10/2017 | Maxfield |
| 9,811,480 B2 | 11/2017 | Christian et al. |
| 9,852,282 B2 | 12/2017 | Jeran et al. |
| 9,876,794 B2 | 1/2018 | Adkins et al. |

(56) References Cited

U.S. PATENT DOCUMENTS

| | | | |
|---|---|---|---|
| 9,895,917 B2 | 2/2018 | Corvese et al. | |
| 9,914,306 B2 | 3/2018 | Jeran | |
| 9,917,821 B2 * | 3/2018 | Gillmore | H04L 63/062 |
| 9,922,276 B2 | 3/2018 | Fister et al. | |
| 9,994,036 B2 | 6/2018 | Angulo et al. | |
| 10,031,882 B2 | 7/2018 | Srivastava | |
| 10,052,878 B2 | 8/2018 | Bonneton | |
| 10,107,667 B2 | 10/2018 | Cumbie et al. | |
| 10,146,608 B2 | 12/2018 | Giovannini et al. | |
| 10,155,379 B2 | 12/2018 | Ng et al. | |
| 10,214,018 B2 | 2/2019 | Nozawa et al. | |
| 10,214,019 B2 | 2/2019 | Campbell-Brown et al. | |
| 10,259,230 B2 | 4/2019 | Asauchi | |
| 10,279,594 B2 | 5/2019 | Horade et al. | |
| 10,338,838 B2 | 7/2019 | Olarig | |
| 10,452,582 B2 | 10/2019 | Hershman et al. | |
| 10,471,725 B2 | 11/2019 | Esterberg et al. | |
| 10,875,318 B1 | 12/2020 | Gardner et al. | |
| 10,894,423 B2 | 1/2021 | Gardner et al. | |
| 11,034,157 B2 | 6/2021 | Gardner et al. | |
| 2001/0029554 A1 | 10/2001 | Namba | |
| 2001/0033316 A1 | 10/2001 | Eida | |
| 2002/0012016 A1 | 1/2002 | Wilson et al. | |
| 2002/0012616 A1 | 1/2002 | Zhou et al. | |
| 2002/0033855 A1 | 3/2002 | Kubota et al. | |
| 2002/0109761 A1 | 8/2002 | Shimizu et al. | |
| 2002/0129650 A1 | 9/2002 | Zimmermann et al. | |
| 2002/0154181 A1 | 10/2002 | Kubota et al. | |
| 2003/0009595 A1 | 1/2003 | Collins | |
| 2003/0018300 A1 | 1/2003 | Duchon et al. | |
| 2003/0071862 A1 | 4/2003 | Tsukada et al. | |
| 2003/0202024 A1 | 10/2003 | Corrigan | |
| 2004/0021711 A1 | 2/2004 | Hasseler et al. | |
| 2004/0036733 A1 | 2/2004 | Kubota et al. | |
| 2004/0085382 A1 | 5/2004 | Kosugi et al. | |
| 2004/0143710 A1 * | 7/2004 | Walmsley | B41J 2/04573 |
| | | | 711/144 |
| 2004/0155913 A1 | 8/2004 | Kosugi et al. | |
| 2004/0252146 A1 | 12/2004 | Naka et al. | |
| 2005/0010910 A1 | 1/2005 | Lindhorst et al. | |
| 2005/0052661 A1 * | 3/2005 | Lapstun | H04N 1/00326 |
| | | | 358/1.1 |
| 2005/0060546 A1 * | 3/2005 | Parry | B41J 2/17546 |
| | | | 713/171 |
| 2005/0093910 A1 | 5/2005 | Im | |
| 2005/0125105 A1 | 6/2005 | Halstead et al. | |
| 2005/0126282 A1 | 6/2005 | Maatuk | |
| 2005/0185595 A1 | 8/2005 | Lee | |
| 2005/0219600 A1 * | 10/2005 | Lapstun | B41J 2/17513 |
| | | | 358/1.14 |
| 2005/0229699 A1 | 10/2005 | Chai et al. | |
| 2006/0007253 A1 | 1/2006 | Kosugi | |
| 2006/0007295 A1 | 1/2006 | Ueda | |
| 2006/0017776 A1 * | 1/2006 | Morton | B41J 2/1755 |
| | | | 347/49 |
| 2006/0072952 A1 | 4/2006 | Walmsley et al. | |
| 2006/0110199 A1 | 5/2006 | Walmsley et al. | |
| 2006/0164444 A1 * | 7/2006 | Ferguson | G06F 3/1284 |
| | | | 347/2 |
| 2006/0181583 A1 | 8/2006 | Usuda | |
| 2006/0181719 A1 | 8/2006 | Aoki et al. | |
| 2006/0221386 A1 | 10/2006 | Brooks et al. | |
| 2006/0244795 A1 | 11/2006 | Hayasaki et al. | |
| 2006/0268030 A1 | 11/2006 | Walmsley et al. | |
| 2006/0274103 A1 | 12/2006 | Kim | |
| 2006/0290723 A1 | 12/2006 | Jeong | |
| 2007/0024650 A1 | 2/2007 | Reinten et al. | |
| 2007/0068249 A1 | 3/2007 | Eguchi et al. | |
| 2007/0088816 A1 | 4/2007 | Hrustemovic et al. | |
| 2007/0115307 A1 | 5/2007 | Smith | |
| 2007/0146409 A1 | 6/2007 | Kubota et al. | |
| 2007/0247497 A1 | 10/2007 | Buchanan et al. | |
| 2008/0024555 A1 | 1/2008 | Kimura | |
| 2008/0041152 A1 | 2/2008 | Schoenberg | |
| 2008/0107151 A1 | 5/2008 | Khadkikar et al. | |
| 2008/0129779 A1 | 6/2008 | Walmsley et al. | |
| 2008/0143476 A1 | 6/2008 | Kwok et al. | |
| 2008/0165232 A1 | 7/2008 | Yuen | |
| 2008/0192074 A1 | 8/2008 | Dubois et al. | |
| 2008/0211838 A1 | 9/2008 | Zhang | |
| 2008/0246626 A1 | 10/2008 | Sheafor et al. | |
| 2008/0298455 A1 | 12/2008 | Greenblat et al. | |
| 2008/0307134 A1 | 12/2008 | Geissler et al. | |
| 2009/0013779 A1 | 1/2009 | Usui et al. | |
| 2009/0021766 A1 | 1/2009 | Yamazaki | |
| 2009/0177823 A1 | 7/2009 | Chao | |
| 2009/0179678 A1 | 7/2009 | Hardin et al. | |
| 2009/0290005 A1 | 11/2009 | Wanibe et al. | |
| 2009/0309941 A1 | 12/2009 | Price et al. | |
| 2009/0319802 A1 * | 12/2009 | Walmsley | H04L 9/3247 |
| | | | 713/189 |
| 2010/0082271 A1 | 4/2010 | McCann et al. | |
| 2010/0138745 A1 | 6/2010 | McNamara et al. | |
| 2010/0205350 A1 | 8/2010 | Bryant-Rich | |
| 2010/0220128 A1 | 9/2010 | Zaba et al. | |
| 2010/0248208 A1 | 9/2010 | Okubo et al. | |
| 2010/0254202 A1 | 10/2010 | Asauchi | |
| 2010/0257327 A1 | 10/2010 | Kosugi | |
| 2010/0306431 A1 * | 12/2010 | Adkins | G06F 13/4291 |
| | | | 710/110 |
| 2011/0009938 A1 | 1/2011 | Dowling | |
| 2011/0029705 A1 | 2/2011 | Evans | |
| 2011/0050793 A1 | 3/2011 | Kumagai et al. | |
| 2011/0075189 A1 * | 3/2011 | Refstrup | G06F 21/608 |
| | | | 358/1.14 |
| 2011/0087914 A1 | 4/2011 | Files et al. | |
| 2011/0109938 A1 * | 5/2011 | Refstrup | G06F 21/57 |
| | | | 358/1.15 |
| 2011/0113171 A1 | 5/2011 | Radhakrishnan et al. | |
| 2011/0131441 A1 | 6/2011 | Asauchi | |
| 2011/0279530 A1 | 11/2011 | Love et al. | |
| 2011/0285027 A1 | 11/2011 | Lee | |
| 2012/0128379 A1 | 5/2012 | Takeda | |
| 2012/0134687 A1 * | 5/2012 | Jones | G03G 15/0863 |
| | | | 399/12 |
| 2012/0194581 A1 * | 8/2012 | Shindo | B41J 2/195 |
| | | | 347/7 |
| 2012/0243559 A1 | 9/2012 | Pan et al. | |
| 2012/0284429 A1 | 11/2012 | Adkins et al. | |
| 2012/0299989 A1 | 11/2012 | Prothon et al. | |
| 2013/0018513 A1 | 1/2013 | Metselaar | |
| 2013/0054933 A1 | 2/2013 | Fister et al. | |
| 2013/0063770 A1 | 3/2013 | Lee et al. | |
| 2013/0067015 A1 | 3/2013 | Vasters | |
| 2013/0067016 A1 | 3/2013 | Adkins et al. | |
| 2013/0155142 A1 | 6/2013 | Browning et al. | |
| 2013/0250024 A1 | 9/2013 | Kakishima | |
| 2013/0295245 A1 | 11/2013 | Gardner et al. | |
| 2014/0040517 A1 | 2/2014 | Fister et al. | |
| 2014/0095750 A1 | 4/2014 | Tailliet | |
| 2014/0164660 A1 | 6/2014 | Decesaris et al. | |
| 2014/0177007 A1 * | 6/2014 | Ganesan | G06F 21/608 |
| | | | 358/1.14 |
| 2014/0211241 A1 | 7/2014 | Rice et al. | |
| 2014/0260520 A1 | 9/2014 | Schoenberg | |
| 2014/0265049 A1 | 9/2014 | Burris et al. | |
| 2014/0337553 A1 | 11/2014 | Du et al. | |
| 2014/0351469 A1 | 11/2014 | Fister et al. | |
| 2014/0354729 A1 | 12/2014 | Vanbrocklin et al. | |
| 2014/0372652 A1 | 12/2014 | Shu | |
| 2014/0375321 A1 | 12/2014 | Ikeya | |
| 2014/0375730 A1 | 12/2014 | Campbell-Brown et al. | |
| 2015/0028671 A1 | 1/2015 | Ragaini et al. | |
| 2015/0052996 A1 | 2/2015 | Niemann | |
| 2015/0074304 A1 | 3/2015 | Adkins et al. | |
| 2015/0089630 A1 | 3/2015 | Lee | |
| 2015/0239254 A1 | 8/2015 | Muyskens et al. | |
| 2015/0285526 A1 | 10/2015 | Smith et al. | |
| 2015/0343792 A1 | 12/2015 | Refstrup | |
| 2015/0378409 A1 | 12/2015 | Dunstan et al. | |
| 2016/0055402 A1 | 2/2016 | Fister et al. | |
| 2016/0098359 A1 | 4/2016 | Adkins et al. | |
| 2016/0110535 A1 | 4/2016 | Booth et al. | |

(56) References Cited

U.S. PATENT DOCUMENTS

| | | | |
|---|---|---|---|
| 2016/0114590 A1 | 4/2016 | Arpin | |
| 2016/0187827 A1* | 6/2016 | Jeran | G06F 21/608 399/12 |
| 2016/0207323 A1 | 7/2016 | Ward et al. | |
| 2016/0279962 A1 | 9/2016 | Ishida et al. | |
| 2016/0357691 A1 | 12/2016 | Ahne | |
| 2016/0364305 A1 | 12/2016 | Pitigoi-Aron | |
| 2016/0368273 A1 | 12/2016 | Ishikawa | |
| 2017/0032135 A1 | 2/2017 | Refstrup | |
| 2017/0050383 A1 | 2/2017 | Bell et al. | |
| 2017/0100941 A1 | 4/2017 | Kuribayashi | |
| 2017/0144448 A1 | 5/2017 | Smith | |
| 2017/0157929 A1 | 6/2017 | Yokoo et al. | |
| 2017/0168976 A1 | 6/2017 | Yost | |
| 2017/0169623 A1 | 6/2017 | Chen et al. | |
| 2017/0182786 A1 | 6/2017 | Angulo et al. | |
| 2017/0189011 A1 | 7/2017 | Stone et al. | |
| 2017/0194913 A1 | 7/2017 | Wilson et al. | |
| 2017/0230540 A1 | 8/2017 | Sasaki | |
| 2017/0274641 A1* | 9/2017 | Pagnon | G01N 11/08 |
| 2017/0330449 A1 | 11/2017 | Lunardhi et al. | |
| 2018/0022104 A1* | 1/2018 | Bonneton | G06F 21/445 347/86 |
| 2018/0032718 A1* | 2/2018 | Soto | G06F 21/606 |
| 2018/0050537 A1 | 2/2018 | Bakker et al. | |
| 2018/0100753 A1 | 4/2018 | Cumbie et al. | |
| 2018/0143925 A1 | 5/2018 | Hocken et al. | |
| 2018/0143935 A1 | 5/2018 | Cox et al. | |
| 2018/0157943 A1 | 6/2018 | Fister et al. | |
| 2018/0162137 A1 | 6/2018 | Van et al. | |
| 2018/0212593 A1 | 7/2018 | Usuda | |
| 2018/0264808 A1 | 9/2018 | Bakker et al. | |
| 2018/0281394 A1 | 10/2018 | Horade et al. | |
| 2018/0281438 A1 | 10/2018 | Horade et al. | |
| 2018/0281444 A1* | 10/2018 | Wada | B41J 2/1721 |
| 2018/0290457 A1 | 10/2018 | Ge et al. | |
| 2018/0302110 A1 | 10/2018 | Solan | |
| 2018/0304640 A1 | 10/2018 | Horne | |
| 2019/0004991 A1 | 1/2019 | Foust et al. | |
| 2019/0011306 A1 | 1/2019 | Cumbie et al. | |
| 2019/0012663 A1 | 1/2019 | Masters | |
| 2019/0013731 A1 | 1/2019 | Gritti | |
| 2019/0023020 A1 | 1/2019 | Anderson | |
| 2019/0061347 A1 | 2/2019 | Bakker et al. | |
| 2019/0064408 A1 | 2/2019 | Smit | |
| 2019/0097785 A1 | 3/2019 | Elenes | |
| 2019/0111694 A1 | 4/2019 | Cumbie et al. | |
| 2019/0111695 A1 | 4/2019 | Anderson et al. | |
| 2019/0111696 A1 | 4/2019 | Anderson et al. | |
| 2019/0118527 A1 | 4/2019 | Anderson et al. | |
| 2019/0126631 A1 | 5/2019 | Anderson et al. | |
| 2019/0137316 A1 | 5/2019 | Anderson et al. | |
| 2019/0138484 A1 | 5/2019 | De et al. | |
| 2019/0217628 A1 | 7/2019 | Horade et al. | |
| 2019/0226930 A1 | 7/2019 | Cumbie et al. | |
| 2019/0240985 A1 | 8/2019 | Ge et al. | |
| 2019/0319915 A1* | 10/2019 | Bush | H04L 61/5038 |
| 2020/0004476 A1* | 1/2020 | Bush | H04L 61/5038 |
| 2020/0159689 A1 | 5/2020 | Koshisaka et al. | |
| 2020/0250322 A1* | 8/2020 | Sayers | B33Y 50/02 |
| 2020/0257477 A1* | 8/2020 | Chen | B41J 29/393 |
| 2020/0314082 A1* | 10/2020 | Enomoto | H04L 9/14 |
| 2021/0334392 A1 | 10/2021 | Panshin et al. | |

FOREIGN PATENT DOCUMENTS

| | | | |
|---|---|---|---|
| CA | 2896345 A1 | 7/2014 | |
| CN | 2603934 Y | 2/2004 | |
| CN | 2734479 Y | 10/2005 | |
| CN | 101859235 A | 10/2010 | |
| CN | 201761148 U | 3/2011 | |
| CN | 102112977 A | 6/2011 | |
| CN | 102231054 A | 11/2011 | |
| CN | 102736627 A | 10/2012 | |
| CN | 103879149 A | 6/2014 | |
| CN | 203651218 U | 6/2014 | |
| CN | 105760318 A | 7/2016 | |
| CN | 106104508 A | 11/2016 | |
| CN | 107209743 A | 9/2017 | |
| CN | 104077537 B * | 4/2018 | B41J 29/393 |
| CN | 108090010 A | 5/2018 | |
| CN | 108819486 A | 11/2018 | |
| CN | 109070594 A | 12/2018 | |
| CN | 209014461 U | 6/2019 | |
| DE | 3712699 A1 | 11/1988 | |
| EP | 0015954 B1 | 6/1984 | |
| EP | 0720916 A2 | 7/1996 | |
| EP | 0994779 A1 | 4/2000 | |
| EP | 1164022 A2 | 12/2001 | |
| EP | 1238811 A1 | 9/2002 | |
| EP | 1285764 A1 | 2/2003 | |
| EP | 1314565 A2 | 5/2003 | |
| EP | 1389531 A1 | 2/2004 | |
| EP | 1524120 A2 | 4/2005 | |
| EP | 1800872 A1 | 6/2007 | |
| EP | 1839872 A1 | 10/2007 | |
| EP | 2237163 A1 | 10/2010 | |
| EP | 2385468 A1 | 11/2011 | |
| EP | 2854063 A1 | 4/2015 | |
| EP | 3161585 A1 | 5/2017 | |
| EP | 3208736 A1 | 8/2017 | |
| GB | 2519181 A | 4/2015 | |
| JP | 04-220353 A | 8/1992 | |
| JP | 2001-292133 A | 10/2001 | |
| JP | 2002-026471 A | 1/2002 | |
| JP | 2003-326726 A | 11/2003 | |
| JP | 2005-262458 A | 9/2005 | |
| JP | 2009-258604 A | 11/2009 | |
| JP | 2010-079199 A | 4/2010 | |
| JP | 2011-113336 A | 6/2011 | |
| JP | 2012-063770 A | 3/2012 | |
| JP | 2013-197677 A | 9/2013 | |
| JP | 2014-534917 A | 12/2014 | |
| JP | 5644052 B2 | 12/2014 | |
| JP | 2016-185664 A | 10/2016 | |
| JP | 2017-196842 A | 11/2017 | |
| JP | 2018-049141 A | 3/2018 | |
| JP | 2018-136774 A | 8/2018 | |
| JP | 2018-161785 A | 10/2018 | |
| JP | 2018-531394 A | 10/2018 | |
| KR | 10-2008-0003539 A | 1/2008 | |
| KR | 10-1785051 B1 | 10/2017 | |
| TW | 200707209 A | 2/2007 | |
| TW | 201202948 A | 1/2012 | |
| TW | 201546620 A | 12/2015 | |
| WO | 98/55318 A1 | 12/1998 | |
| WO | 2007/107957 A1 | 9/2007 | |
| WO | 2008/117194 A1 | 10/2008 | |
| WO | 2009/145774 A1 | 12/2009 | |
| WO | 2012/020443 A1 | 2/2012 | |
| WO | 2012/054050 A1 | 4/2012 | |
| WO | 2012/057755 A1 | 5/2012 | |
| WO | 2013/048430 A1 | 4/2013 | |
| WO | 2015/116092 A1 | 8/2015 | |
| WO | 2016/061480 A2 | 4/2016 | |
| WO | 2016/114759 A1 | 7/2016 | |
| WO | 2016/130157 A1 | 8/2016 | |
| WO | 2017/074334 A1 | 5/2017 | |
| WO | 2017/074342 A1 | 5/2017 | |
| WO | 2017/174363 A1 | 10/2017 | |
| WO | 2017/184147 A1 | 10/2017 | |
| WO | 2017/189009 A1 | 11/2017 | |
| WO | 2017/189010 A1 | 11/2017 | |
| WO | 2017/189011 A1 | 11/2017 | |
| WO | 2017/189013 A1 | 11/2017 | |
| WO | 2018/017066 A1 | 1/2018 | |
| WO | 2018/022038 A1 | 2/2018 | |
| WO | 2018/186847 A1 | 10/2018 | |
| WO | 2018/199886 A1 | 11/2018 | |
| WO | 2018/199891 A1 | 11/2018 | |
| WO | 2018/199895 A1 | 11/2018 | |
| WO | 2018/217185 A1 | 11/2018 | |
| WO | 2019/017963 A1 | 1/2019 | |

(56) References Cited

FOREIGN PATENT DOCUMENTS

| WO | 2019/078834 A1 | 4/2019 |
|---|---|---|
| WO | 2019/078835 A1 | 4/2019 |
| WO | 2019/078839 A1 | 4/2019 |
| WO | 2019/078840 A1 | 4/2019 |
| WO | 2019/078843 A1 | 4/2019 |
| WO | 2019/078844 A1 | 4/2019 |
| WO | 2019/078845 A1 | 4/2019 |
| WO | 2019/196284 A1 | 10/2019 |

OTHER PUBLICATIONS

Epson, "Epson provides the best inks for the job," retrieved at https://www.epson.co.nz/microsite/excellence/inks_why.asp, retrieved on Jul. 1, 2019, 3 pages.

International Searching Authority "International Search Report and Written Opinion " issued in connection with PCT/US2018/063633 mailed on Jul. 23, 2019, 12 pages.

International Searching Authority "International Search Report and Written Opinion " issued in connection with PCT/US2019/017511 mailed on Jul. 25, 2019, 12 pages.

International Searching Authority "International Search Report and Written Opinion " issued in connection with PCT/US2019/026124 mailed on Aug. 26, 2019, 15 pages.

International Searching Authority "International Search Report and Written Opinion " issued in connection with PCT/US2019/026133 mailed on Aug. 26, 2019, 18 pages.

International Searching Authority "International Search Report and Written Opinion " issued in connection with PCT/US2019/026159 dated Aug. 13, 2019, 15 pages.

International Searching Authority "International Search Report and Written Opinion "issued in connection with PCT/US2018/063638 mailed on Aug. 26, 2019, 13 pages.

International Searching Authority "International Search Report and Written Opinion" issued in connection with PCT/US2018/063624 mailed on Aug. 23, 2019, 13 pages.

International Searching Authority "International Search Report and Written Opinion" issued in connection with PCT/US2018/063630 mailed on Aug. 22, 2019, 15 pages.

International Searching Authority "International Search Report and Written Opinion" issued in connection with PCT/US2018/063631 mailed on Aug. 23, 2019, 13 pages.

International Searching Authority "International Search Report and Written Opinion" issued in connection with PCT/US2018/063643 mailed on Aug. 20, 2019, 13 pages.

International Searching Authority "International Search Report and Written Opinion" issued in connection with PCT/US2019/026145 mailed on Sep. 5, 2019, 16 pages.

International Searching Authority "International Search Report and Written Opinion" issued in connection with PCT/US2019/026161 mailed on Aug. 26, 2019, 20 pages.

Laureto, J., et al., "Open Source Multi-Head 3D Printer for Polymer-Metal Composite Component Manufacturing," Technologies, MDPI, 2017, vol. 5, Issue 2, pp. 1-23.

Maxim Integrated Products "1-to-8 I2C Bus Switches/Multiplexers with Bus Lock-Up Detection, Isolation, and Notification" retrieved at https://www.maximintegrated.com/en/products/analog/analog-switches-multiplexers/MAX7356.html, Sep. 2008, 22 pages.

NXP "Introducing A10006 Secure Authenticator Tamper-Resistant Anti Counterfeit Solution", retrieved at https://www.nxp.com/docs/en/supporting-information/A1006-Secure-Authenticator.pdf, retrieved on Jul. 3, 2019, 29 pages.

NXP B.V., "Nxp 2-, 4-, and 8-Channel I2C/SMBus Muxes and Switches PCA954x," retrieved at https://www.nxp.com/docs/en/brochure/75016529.pdf, Jul. 2008, 4 pgs.

NXP Semiconductors N.V., "AN11593: How to Design in and Program the PCA9641 I2C Arbiter," retrieved at https://www.nxp.com/docs/en/application-note/AN11593.pdf, Oct. 23, 2014, 22 pgs.

NXP Semiconductors N.V., "PCA9547: 8-Channel I2C-Bus Multiplexer with Reset," retrieved at https://www.nxp.com/docs/en/data-sheet/PCA9547.pdf, Apr. 1, 2014, 30 pgs.

NXP Semiconductors N.V., "PCA9641: 2-Channel I2C-Bus Master Arbiter," retrieved at https://www.nxp.com/docs/en/data-sheet/PCA9641.pdf, Oct. 27, 2015, 55 pgs.

Phillips Semiconductors, "The I2C-Bus Specification", Version 2.1, Jan. 2000, 46 pgs.

Platform Development Team, "Development of the HP DeskJet 1200C Print Cartridge Platform," Hewlett-Packard Journal, Feb. 1994, pp. 46-54.

Reddit, "Use an accelerometer to measure Z wobble", retrieved at https://www.reddit.com/r/Reprap/comments/6qsoyd/use_an_accelerometer_to_measure_z_wobble/, retrieved on Jul. 1, 2019, 3 pages.

United States Patent and Trademark Office, "Non-Final office action ," issued in connection with U.S. Appl. No. 16/502,479, mailed on Dec. 11, 2019, 13 pages.

United States Patent and Trademark Office, "Non-Final Office action," issued in connection with U.S. Appl. No. 16/460,016, dated Sep. 12, 2019, 12 pages.

United States Patent and Trademark Office, "Non-Final Office action," issued in connection with U.S. Appl. No. 16/505,090, mailed on Sep. 10, 2019, 20 pages.

United States Patent and Trademark Office, "Notice of Allowance," issued in connection with U.S. Appl. No. 16/505,090, mailed on Oct. 22, 2019, 5 Pages.

United States Patent and Trademark Office, "Notice of allowance," issued in connection with U.S. Appl. No. 16/460,016, mailed on Mar. 25, 2020, 10 pages.

United States Patent and Trademark Office, "Notice of Allowance," issued in connection with U.S. Appl. No. 16/502,479, mailed on Apr. 9, 2020, 9 pages.

United States Patent and Trademark Office, "Notice of Allowance," issued in connection with U.S. Appl. No. 16/505,090, mailed on Feb. 12, 2020, 9 pages.

United States Patent and Trademark Office, "Restriction Requirement," issued in connection with U.S. Appl. No. 16/502,479, mailed on Aug. 15, 2019, 7 pages.

United States Patent and Trademark Office, "Notice of ,Allowance," Issued in connection with U.S. Appl. No. 16/728,207, mailed on Feb. 19, 2020 19 pages.

* cited by examiner

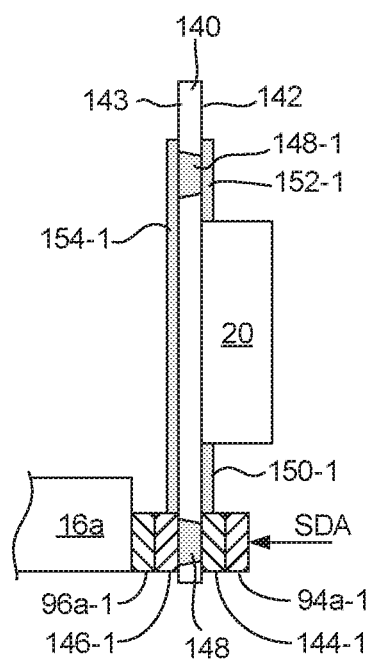 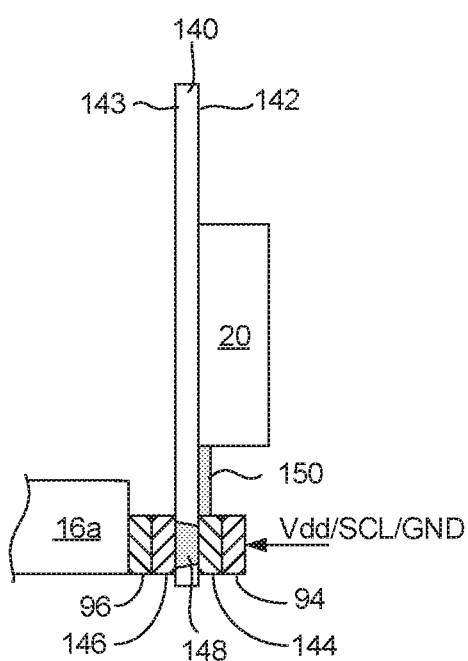
Fig. 4a
Fig. 4b

LOGIC CIRCUITRY PACKAGE FOR PRINT APPARATUS

CROSS-REFERENCE TO RELATED APPLICATIONS

This Utility Patent Application is a U.S. National Stage filing under 35 U.S.C. § 371 of PCT/US2020/030860, entitled LOGIC CIRCUITRY PACKAGE FOR PRINT APPARATUS, filed Apr. 30, 2020, incorporated by reference herein.

BACKGROUND

Some 2D and 3D printing systems include a number of replaceable print apparatus components, such as inkjet printhead assemblies, and print material containers (e.g. inkjet cartridges, toner cartridges, ink supplies, build material supplies, etc.), for example. In some cases, such replaceable print apparatus components include logic circuitry to communicate with logic circuitry of the print apparatus in which they are installed. Information communicated by replaceable print material containers, for example, may include an identity (such as a serial number and/or brand, for example), identifying characteristics (such as a color, color mapping, and a color map reconstruction, for example), and operating information (such as a print material level and an operating pressure).

Communication between the print apparatus and associated replaceable print apparatus components may be carried out using serial data bus protocols, such as Serial Peripheral Interface (SPI) protocol, or Inter-integrated circuit (I2C or I2C) protocol, where at least one "master" integrated circuit (IC) communicates with at least one "slave" IC via a serial data bus. In a case where a printing system utilizes I2C communications, the print apparatus may include a master IC, and each replaceable print apparatus component may include a slave IC, with each slave IC having a corresponding I2C address and communicating with the master IC over a shared I2C serial data bus. The slave ICs respond to requests (commands) from the master IC, and may include logic circuitry to carry out functions associated with the operation of the replaceable print apparatus component.

BRIEF DESCRIPTION OF THE DRAWINGS

FIG. 4A is a block and schematic diagram generally illustrating a flexible wiring substrate for connecting a logic circuitry package to a print apparatus, according to one example.

FIG. 4B is a block and schematic diagram generally illustrating a flexible wiring substrate for connecting a logic circuitry package to a print apparatus, according to one example.

DETAILED DESCRIPTION

Figure 1:
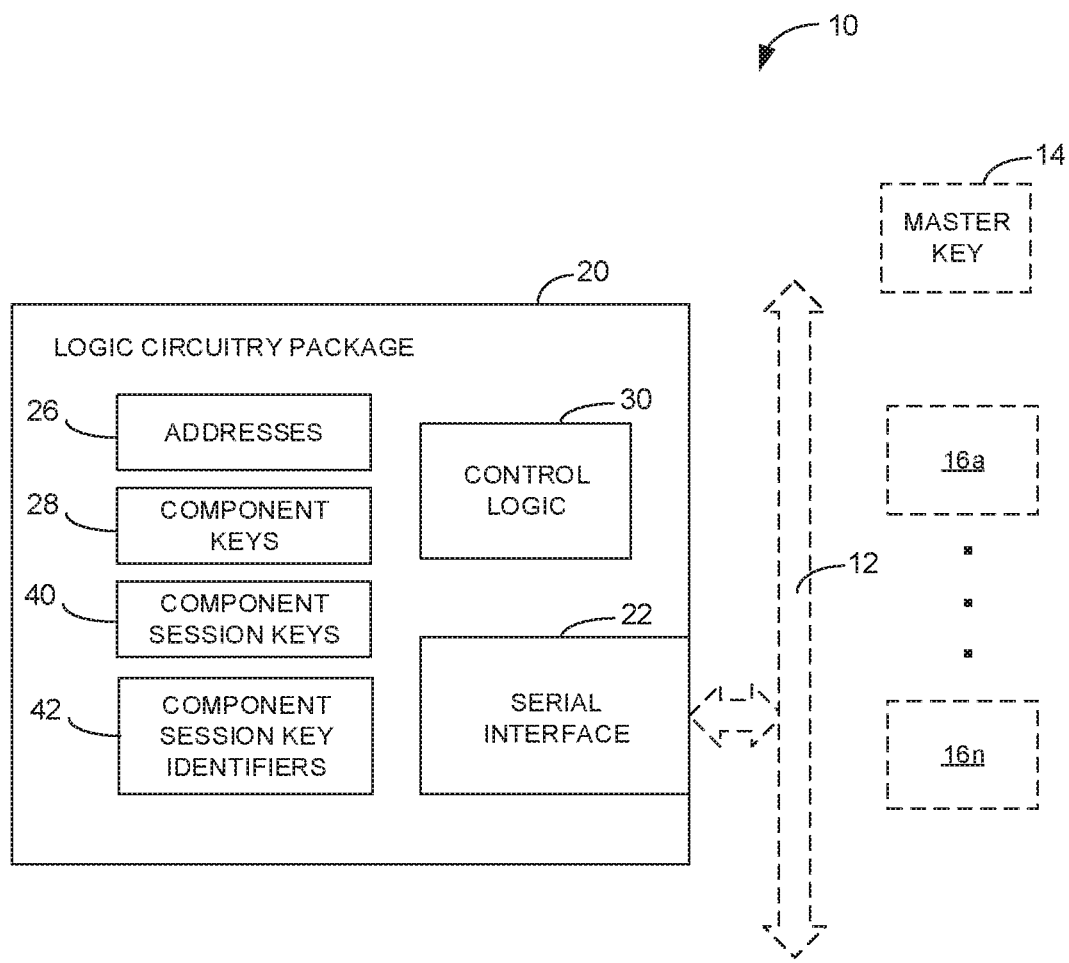
FIG. 1 is a block and schematic diagram generally illustrating a logic circuitry package for a print apparatus, according to one example.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Some 2D and 3D printing systems include a number of replaceable or consumable print apparatus components. Example 2D and 3D printing systems include two-dimensional imaging apparatus and three-dimensional additive manufacturing apparatus, such as inkjet printers, dry toner printers, liquid toner printers, and 3D powder bed inkjet printers, for example. Example replaceable print apparatus components include any number of print material containers, such as ink tanks, ink bottles, inkjet printhead cartridges, dry toner reservoirs, liquid toner reservoirs, dry toner cartridges, and build material supplies; and other components that may or may not contain print materials, such as printheads (e.g., a thermal inkjet printhead).

In some cases, such replaceable print apparatus components include logic circuitry to communicate with logic circuitry of the print apparatus in which the replaceable print apparatus components are installed. In the case of a replaceable print apparatus component being a replaceable print material container, for example, information communicated by a replaceable print material container with the print apparatus may include an identity (such as a serial number and/or brand, for example), identifying characteristics (such as a color, color mapping, and a color map reconstruction, maximum print agent volume, and functionality, for example), and operating information (such as a print material level and an operating pressure, for example).

Communication between the print apparatus and replaceable print apparatus components may be carried out using serial data bus protocols, such as SPI protocol or I2C protocol, where at least one master IC communicates with at least one slave IC over a serial data bus. For example, where a printing system utilizes I2C communications, logic circuitry of the print apparatus may operate as a master IC, while logic circuitry of each replaceable print apparatus component may operate as a slave IC, with each slave IC having a corresponding I2C address and communicating with the master IC over the I2C serial data bus.

Slave ICs may include logic circuitry to perform data operations associated with the replaceable print apparatus component and to respond to requests (commands) from the master IC via the I2C serial data bus. For example, the print apparatus, via the master IC, may transmit commands over the I2C serial data bus to the slave ICs to perform various operations. A request may comprise a "write" request (e.g., to write data to a memory location), or a request to perform an action, such as performing a measurement (e.g., ink level measurement), carrying out a printing task, and a data processing action, for example. In examples, a master IC (as part of a printer controller) may send a command to a slave IC (as part of a replaceable print apparatus component) to perform an operation to load data into a memory (e.g., a buffer and/or specific register of a memory), and, in response to a subsequent print apparatus command, the slave IC may transmit the data over the I2C serial data bus.

In some cases, to ensure the quality of a replaceable print apparatus component, and thereby ensure proper operation of the print system, the print apparatus may perform validation processes to verify that a replaceable print apparatus component originates from an authorized source. For example, a print apparatus command (a "read" request) may request identification and/or authentication information to validate the replaceable print apparatus component, which may result in the replaceable print apparatus component loading such information into a memory buffer, and subsequently serially transmitting such information via the I2C serial data bus. In some cases, to perform such validation, communications between the master IC and each slave IC may be cryptographically authenticated. In one case, see, for example, U.S. Pat. No. 9,619,663, the slave ICs may include a number of secret keys derived from a number of secret keys of the master IC of the print apparatus, where the secret keys are used to generate cryptographically authenticated communications between the master and slave ICs.

Further authentication mechanisms may also be employed, such as logic and dedicated hardware for providing responses within predetermined time windows, such as described, for example, by U.S. Pat. No. 9,561,662. Other validation processes may include integrity checks to ensure that a replaceable print apparatus component and/or the logic circuitry (e.g. slave IC) associated therewith is functioning as expected.

In some cases, a replaceable print apparatus component may include more than one slave IC, such as two slave ICs, for example, where communication by a master IC with a first one of the two slave ICs may be cryptographically authenticated, while communications with the second of the two slave ICs may be non-authenticated.

While logic circuitry onboard each replaceable print apparatus component is effective at providing authenticated communication between the print apparatus and the replaceable print apparatus component, providing logic circuitry on each replaceable print apparatus component is costly.

According to one example, the present disclosure provides a single logic circuitry package that is connectable to secure firmware of the print apparatus and provides cryptographically authenticated responses to the secure firmware in response to messages directed to a number of different I2C addresses using different secret keys corresponding to each of the addresses. In one example, the single logic circuitry package is implemented separately from any of replaceable print apparatus components. In other examples, the single logic circuitry package may reside in one of the replaceable print apparatus components, such as part of a print material container (e.g., a black ink supply). In one example, the single logic circuitry package communicates with the secure firmware of the print apparatus over an I2C serial bus.

Employing a single logic circuitry package representing multiple I2C addresses and using multiple keys for cryptographic authentication, in accordance with the present disclosure, may reduce the costs of replaceable print apparatus components. By employing a single logic circuitry package to respond to secure communications directed to multiple addresses using multiple keys, separate logic circuitry may not need to be attached to each individual replaceable print apparatus component of a printing system.

FIG. 1 is a block and schematic diagram generally illustrating a logic circuitry package 20 for a print apparatus 10, according to one example of the present disclosure. Logic circuitry package 20 interfaces with a serial data bus 12 of print apparatus 10 via a serial data bus interface 22, and is configured to respond to messages on serial data bus 12 directed to a number of different addresses 26 using different component keys 28 for cryptographic authentication corresponding to each of the different addresses 26, where the different component keys 28 are related to at least one master key 14 of print apparatus 10.

In one example, logic circuitry package 20 is a single package component having a single data contact to interface with serial data bus 12 via which messages to the number of different addresses 26 are received and corresponding responses to such messages are transmitted. In one example, serial data bus interface 22 is an I2C serial data bus interface, where the different addresses 26 are I2C addresses.

In examples, in response to a session request message on serial data bus 12 from print apparatus 10 to establish a secure communication session related to one of the different addresses 26, control logic 30 of logic circuitry package 20 establishes such a secure communication session and cryptographically authenticates responses to each subsequent message of the communication session from print apparatus 10 using one of the component keys 28 corresponding to the one of the different addresses 26. As will be described in greater detail below, in examples, for each of the different addresses 26, in response to receiving a session request message to establish a communication session with the address, control logic 30 generates a component session key 40 and a component session key identifier 42 based on a component key 28 corresponding to the address 26, and provides a session initiation response message including the component session key identifier 42 on serial data bus 12.

In other examples, as will be described in greater detail below, for each of the different addresses 26, after establishment of a secure communication session via a session initiation request/session initiation response message exchange, in response to receiving an authenticated request message of the communication session directed to the address, where such authenticated request message includes a first message authentication code (MAC) based on a session key associated with master key 14 and on the component session key identifier 42 included in the session initiation response message, control logic 30 generates a second MAC related to component session key 40 and the first MAC and provides a cryptographically authenticated response message including the second MAC along with the data requested by the authenticated request message.

In examples, print apparatus 10 may include a plurality of consumable or replaceable print apparatus components 16, illustrated as replaceable print apparatus components 16a to 16n, where the number of different addresses 26 correspond to different ones of the replaceable print apparatus components 16. Replaceable print apparatus components 16 may include any number of replaceable components such as print material dispensing components (e.g., printheads), and print material containers such as cartridges for storing liquid print agent (e.g., ink) for 2D and 3D printing, toner, and 3D print agent or build material, for example. As will be described in greater detail below, in accordance with examples of the present disclosure, logic circuitry package 20 maintains operating data related to each of the different addresses 26, such as operating data associated with replaceable print apparatus components 16 where the different addresses 26 correspond to such replaceable print apparatus components 16. In one example, such operating data may include component keys 28, component identification information, and operational and non-operational parameters for both the replaceable component and the print apparatus.

In accordance with examples of the present disclosure, by employing a single logic circuitry package 20 to provide cryptographically authenticated communication related to a number of different addresses using different component keys for each address, it may not be necessary for various replaceable print apparatus components, such as replaceable print apparatus components 16, for example, to include such logic circuitry (e.g., microcontrollers), thereby reducing the costs of such print apparatus components.

Figure 2:
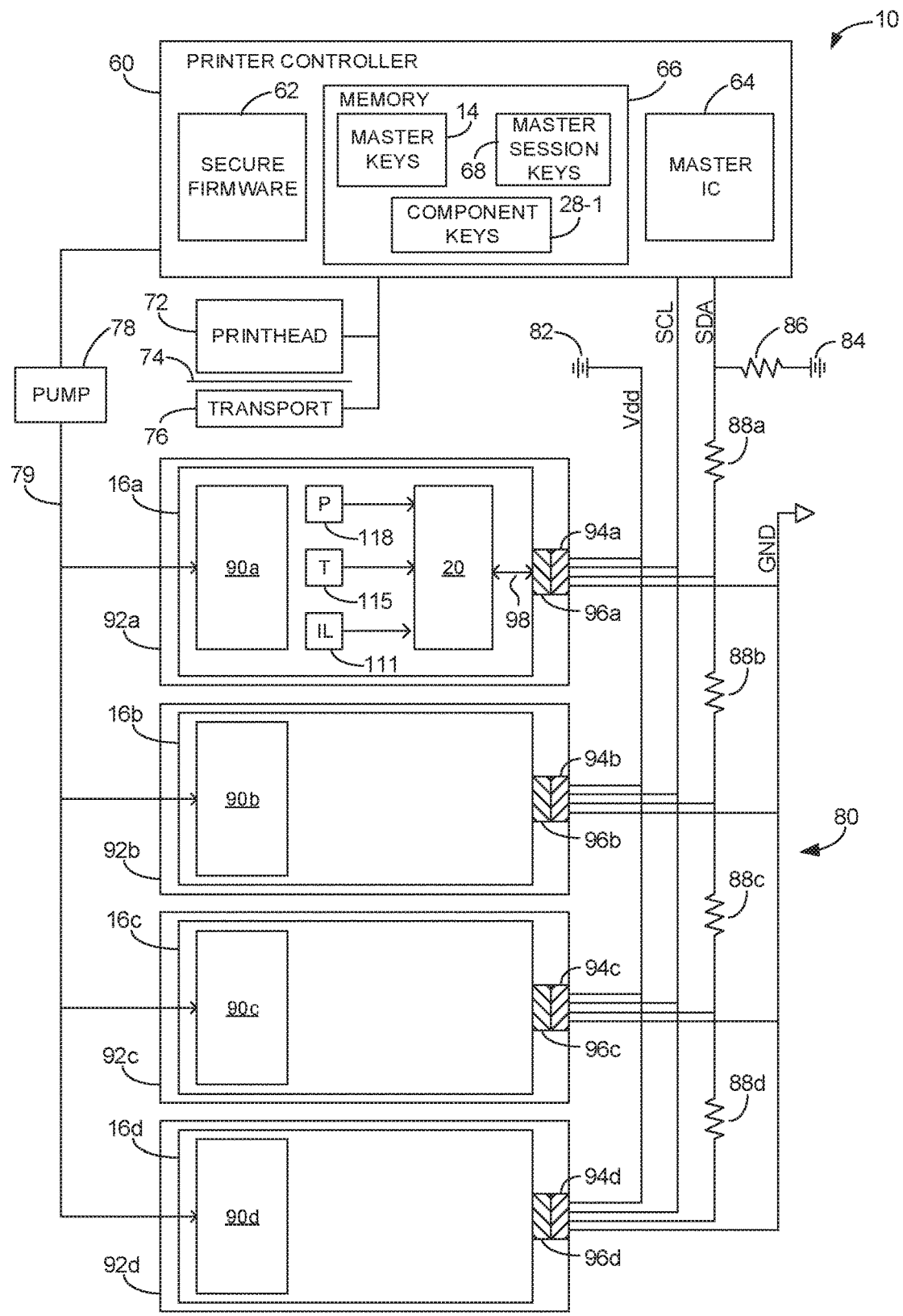
FIG. 2 is a block and schematic diagram generally illustrating a print apparatus including a logic circuitry package, according to one example.

FIG. 2 is a block and schematic diagram generally illustrating a print apparatus 10 employing a logic circuitry package 20, in accordance with the present disclosure, to carry out cryptographically authenticated communications related to a number of different addresses 26 (see FIG. 3, which illustrates one example of logic circuitry package 20, an example of the operation of which is described in conjunction with FIG. 2 below). Continuing with FIG. 2, in one example, print apparatus 10 includes a printer controller 60, a serial data bus 80, and a number of replaceable print apparatus components 16, illustrated as replaceable print apparatus components 16a to 16d. In one example, the number of different addresses 26 comprises a number of different first default addresses (see 102 in FIG. 3), with each of the different first default addresses corresponding to a different one of the replaceable print apparatus components 16a to 16d. In one example, as will be described in greater detail below, the number of different addresses 26 further includes second default addresses (see 104 in FIG. 3) corresponding to the different first default addresses.

In one example, printer controller 60 includes secure firmware 62 (e.g., a programmed microprocessor), a master IC 64 controlled by firmware 62, and a memory 66 for storing operating information, such as an operating program and at least one master key 14. Secure firmware 62 communicates with various components of print apparatus 10 on serial data bus 80, including directing messages (commands) to each of the different first default addresses of replaceable print apparatus components 16a to 16d, over serial data bus 80 via master IC 64. In one example, secure firmware 62 may reside within master IC 64. In one example, memory 66 may comprise a secure microcontroller including secure memory storage.

As described in greater detail below, logic circuitry package 20 is configured to respond to messages directed by printer controller 60 over serial data bus 80 to the each of the different first default addresses using different component keys 28 corresponding to each different first default address for cryptographic authentication, where the different component keys 28 are related to at least one master key 14 of print apparatus 10.

In one example, logic circuitry package 20 is disposed as part of one of the replaceable print apparatus components 16, such as replaceable print apparatus component 16a. In other examples, portions of logic circuitry package 20 may be disposed in multiple of the replaceable print apparatus components 16a to 16d. In other examples, logic circuitry package 20 may be disposed within print apparatus 10 separately from replaceable print apparatus components 16. In other examples, a portion of logic circuitry package 20 may be disposed within at least one of the replaceable print apparatus components 16, and another portion may be disposed separately from replaceable print apparatus components 16. In one example, logic circuitry package 20 is a single package component having a single contact point to interface with serial data bus 80 and being configured to receive messages directed to each of the first default addresses of the replaceable print apparatus components 16 and to transmit responses to such messages via the single contact point.

In one example, print apparatus 10 includes a print material dispensing apparatus 72 to dispense print material onto a print media 74 conveyed by a media transport mechanism 76. In one example, each of the replaceable print apparatus components 16a to 16d comprises a print material cartridge which provides print material stored within a corresponding reservoir 90a to 90d to print material dispensing apparatus 72. In one example, print material dispensing apparatus 72 is an inkjet printhead controlled by printer controller 60 to eject drops of ink in a desired pattern to form a desired print image on print media 74, with each print material cartridge 16a to 16d being an ink cartridge holding ink in a corresponding reservoir 90a to 90d, where controller 60 pressurizes ink reservoirs 90 via a pump 78 to supply ink from print material cartridges 16a to 16d to inkjet printhead 72.

In examples, each print material cartridge 16a to 16d may hold a different ink color. In one case, reservoir 90a of print material cartridge 16a may hold black ink, reservoir 90b of print material cartridge 16b may hold cyan ink, reservoir 90c of print material cartridge 16c may hold magenta ink, and reservoir 90d of print material cartridge 16d may hold yellow ink.

In one example, print apparatus 10 includes a number of cartridge slots 92a to 92d into which print material cartridges 16a to 16d may be selectively inserted or removed. In one example, each of the cartridge slots 92a to 92d corresponds to a particular ink color. Continuing with the above example, in one instance, cartridge slot 92a is a black ink slot to hold black print material cartridge 16a, cartridge slot 92b is a cyan ink slot to hold cyan print material cartridge 16b, cartridge slot 92c is a magenta ink slot to hold magenta print material cartridge 16c, and cartridge slot 92d is a yellow ink slot to hold yellow print material cartridge 16d.

In one example, each cartridge slot 92 includes a set of contacts 94, illustrated as contacts 94a to 94d, which connect cartridge slots 92a to 92d to serial data bus 80. In one example, each print material cartridge 16a to 16d includes a set of contacts 96, illustrated as contacts 96a to 96d, which couple with the respective set of contacts 94a to 94d of the corresponding cartridge slot 92a to 92b to connect the print material cartridges 16a to 16d to serial data bus 80. In one example, logic circuitry package 20 disposed within print material cartridge 16a is connected to serial data bus 80 via contacts 94a and 96a and a communication link 98. In other example, contacts 96b to 96d may be absent from print material cartridges 16b to 16d not including logic circuitry package 20.

In one example, serial data bus 80 is an I2C serial data bus, such that the corresponding first and second default address of each print material cartridge 16a to 16d is an I2C address. In the illustrated example, I2C serial data bus 80 includes a clock line SCL, a bidirectional data line SDA, a ground line, GND, and a power line Vdd, connected to a voltage source 82. Data line SDA is connected to a voltage source 84 via a pull-up resistor 86. In one example, a series of divider resistors, illustrated as divider resistors 88a to 88d, are connected to form a resistive ladder network with divider resistor 88a being connected between cartridge slot 92a and printer controller 60, divider resistors 88a and 88b being series-connected between cartridge slot 92b and printer controller 60, divider resistors 88a-88c being series-connected between cartridge slot 92c and printer controller 60, and divider resistors 88a-88d being series-connected between cartridge slot 92d and printer controller 60. In one example, as will be described in greater detail below, such a resistive ladder network may be employed by printer controller 60 to determine a cartridge slot 92a to 92d in which a print material cartridge 16a to 16d is inserted. It is noted that, in other examples, divider resistor 88a may not be employed between printer controller 60 and first cartridge slot 16a.

Figure 3:
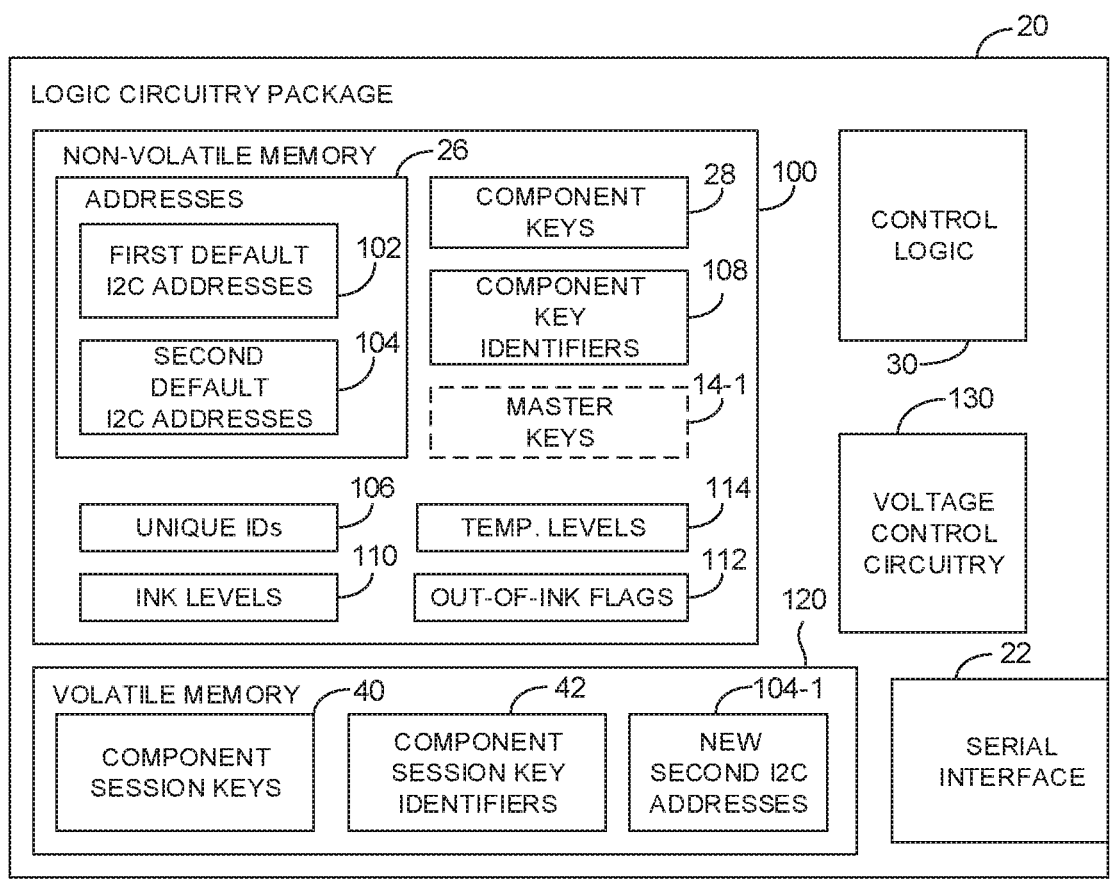
FIG. 3 is a block and schematic diagram generally illustrating a logic circuitry package for a print apparatus, according to one example.

FIG. 3 is a block and schematic diagram generally illustrating logic circuitry package 20, according to one example. Logic circuitry package 20 includes an I2C serial interface 22 to interface with I2C bus 80 (see FIG. 2), control logic 30, a non-volatile memory 100, and a volatile memory 120. In one example, non-volatile memory 100 stores the first default I2C address 102 and the second default I2C address 104 of each print material cartridge 16a to 16d (see FIG. 2). In one example, in lieu of storing first and second default I2C addresses 102 and 104, upon each power-up, logic circuitry package 20 algorithmically derives first default I2C addresses 102 and second default I2C addresses 104 from values stored in nonvolatile memory 100 (e.g., in a lookup table) which are representative of first and second default I2C addresses 102 and 104. In another example, upon each power-up, logic hardware of logic circuitry package 20 generates first and second default I2C addresses 102 and 104.

In one example, for each first default I2C address 102, nonvolatile memory 100 stores a corresponding unique ID 106 representative of an ID of the corresponding print material cartridge 16a to 16d. In one example, for each first default I2C address 102 representing print material cartridges 16a to 16d, non-volatile memory 100 stores a number of component keys 28 and a corresponding component key identifier 108 for each component key 28, where each component key 28 is related to (e.g., derived from) a corresponding master key 14 stored in printer controller 60. For example, in one case, each first default I2C address 102 may have 8 component keys 28, with each of the 8 component keys 28 being related to a different one of 8 master keys 14 stored in printer controller 60. In one example, for each first default I2C address 102, non-volatile memory 100 further stores operating data representative of operating data of the corresponding print material cartridge 16a to 16d. In one example, logic circuitry package 20 stores master keys 14-1 related to master keys 14 (e.g., identical) of printer controller 60. In one example, based on the respective unique IDs, logic circuitry package 20 calculates the component keys 28 for each first default I2C address 102 from master keys 14-1.

An example operation of logic circuitry package 20 is described below with reference to FIGS. 2 and 3. When print apparatus 10 is not performing a "print job" (i.e., not printing images to print media 74), logic circuitry package 20, along with print material cartridges 16a to 16d, are powered down, such that previously stored information in volatile memory 120 is not maintained. Upon commencement of a print job, print material cartridges 16a to 16d, along with logic circuitry package 20, are powered up such that logic circuitry package 20, and other components on serial data bus 80, are enabled to communicate with printer controller 60.

I2C commands directed by printer controller 60 to I2C addresses of print apparatus components on serial data bus 80 are carried out in the form of I2C data packets or frames, where a data packet begins with a START condition (e.g., a fall in voltage on the SDA line while the SCL line is high), and ends with a STOP condition (e.g. a rise in voltage on the SDA line while the SCL line is high). Between the START and STOP conditions, the packet includes a series of data bytes, where a first data byte represents the I2C address of the component to which the command is being directed. Subsequent data bytes of the packet may define a command code (indicative of an action to be performed by the component), and additional command data (e.g., additional command parameters, write data, and MACs).

As will be described in greater detail below, during a print job, logic circuitry package 20 monitors communications on serial data bus 80 from printer controller 60 and maintains address-specific communication sessions with printer controller 60 for each of the first and second I2C addresses which emulate expected responses and functionalities of the corresponding print material cartridges 16a to 16d. As will be described in greater detail below, in one example, for each of the print material cartridges 16a to 16d, it is noted that only one of the first and second I2C addresses is active at a given time.

In examples, upon recognizing an I2C START condition of an I2C data packet on serial data bus 80, logic circuitry package 20 receives the subsequent address byte and compares the address represented by the address byte with the first default I2C addresses 102 representing print material cartridges 16a to 16d. If there is no match, logic circuitry package 20 waits for the next I2C start condition.

If there is a match between the I2C address represented by the address byte and one of the first default I2C addresses 102, logic circuitry package 20 receives the subsequent command data bytes. In one example, a data byte following the address byte represents a command code, where logic circuitry package 20 includes, such as within non-volatile memory 100, a command code look-up table for each of the first default I2C address 102 which provides instructions for control logic 30 to carryout operations to satisfy the designated command. In one example, the command code is indicative of whether a command from printer controller 60 is authenticated. In other examples, control logic 30 performs the operations and returns a response message including data responsive to the designate command to printer controller 60 via serial data bus 80.

In examples, each first default I2C address corresponding to print material cartridges 16a to 16d has a number of corresponding I2C commands to which logic circuitry package 20 responds. In one case, the requested I2C command by printer controller 60 may be a "read" command to read the unique ID 106 corresponding to one of the first default I2C addresses 102 designate by the read command. In one case, upon initiation of a print job, printer controller 60 may issue a series of read commands directed to each of the first default I2C addresses 102 to read the corresponding unique ID from a designated memory location, where logic circuitry package 20 carries out each read request and provides a separate response to each read command including the requested unique ID. In one example, based on the respective unique ID, master IC 64 of printer controller 60 calculates the component keys 28 for each first default I2C address 102 from master keys 14, as indicated by component keys 28-1 in memory 66 (see FIG. 2).

In one case, during a print job, to verify an authenticity of print material cartridges 16a to 16d represented by corresponding first default I2C addresses 102, printer controller 160 may issue a "Start Session" command to initiate a secure communication session with each of the first default I2C addresses 102. As an illustrative example, printer controller 60 may issue a "Start Session" command directed to the first default I2C address 102 for yellow print material cartridge 16d. After the START condition on serial data bus 80, and after recognizing that that I2C address represented by the subsequent address byte matches the first default I2C address 102 corresponding to yellow print material cartridge 16*d*, logic circuitry package receives the subsequent command bytes and determines, such as via the command code and lookup table, that the command is a "Start Session" command.

In one example, the "Start Session" command data includes data designating a particular component key 28 of a number of component keys corresponding to the first default I2C address 102 representing yellow print material cartridge 16*d*, and a host value (which may be a random value generated by master IC 64). In response, according to one example, logic circuitry package 20 generates a component value corresponding to the first default I2C address 102 representing yellow print material cartridge 16*d* (such as a counter value which is incremented for each "Start Session" command). In one example, logic circuitry package 20 constructs a component session key identifier 42 based on the component key identifier 108 of the designated component key 28, the host value, and the component value. In one example, logic circuitry package 20 then derives a component session key 40 from the designated component key 28 and the component session key identifier 42. In one example, logic circuitry package 20 stores component session key 40 in volatile memory 100, and returns component session key identifier 42 in a response message to printer controller 60.

Upon receiving the response message, master IC 64 derives a master session key 68 from the component session key identifier 42 and the component key 28-1 as designated by the "Start Session" command, where master session key 68 should match the component session key 40. Thereafter, printer controller 60 sends an "authenticated" command directed to the first default I2C address 102 for yellow print material cartridge 16*d*, where the authenticated command includes a first MAC computed using the corresponding master session key 68. As an illustrated example, the authenticated command may be a "read" command to read data from a specified memory location corresponding to the first default I2C address 102 for yellow print material cartridge 16*d*, where the read command includes the designated I2C address, a command code, command parameters (e.g., a designated memory location and how many bytes to read), and a first MAC, where the first MAC is computed by master IC 64 using the corresponding Master Session Key 68, the command code, and the command parameters.

In response, logic circuitry package 20 reads the data from the designated memory location, and provides a response message including the read data from the designated location and a second MAC, where the second command code is calculated by controller 30 using the read data, the Component Session Key 40, and the first MAC. Upon receiving the response message from logic circuitry package 20, printer controller 60 computes a third MAC using the read data in the response message, the corresponding Master Session Key 68, and the first MAC. Printer controller 60 then compares the third MAC with the second MAC to determine the authenticity of the responses to commands directed to the first default I2C address 102 for yellow print material cartridge 16*d*. If the third MAC matches the second MAC, printer controller 60 deems the responses to commands directed to the first I2C address 102 for yellow print material cartridge 16*d* to be authenticated and that the read data provided by the response message can be trusted. Conversely, if there is a mismatch, printer controller 60 deems the responses to commands directed to the first default I2C address 102 for yellow print material cartridge 16*d* to be invalid.

In examples, after initiation of the secure communication session via the "Start Session" command, the above authentication process is performed for each command message directed to the first I2C address 102 for yellow print material cartridge 16*d* for a remainder of the secure communication system. In this regard, component session key 40 is maintained within volatile memory 120, with the first, second, and third MACs being generated for each command-response message pair related to the first default I2C address 102 for yellow print material cartridge 16*d*.

In examples, an authentication process as described above is carried out with printer controller 60 by logic circuitry 60 to establish secure, cryptographically authenticated communication sessions with each of the first default I2C addresses 102, with the derived component session key 40 for each of the first default I2C addresses 102 being stored in volatile memory 120 for a duration of the print job.

In examples, after a secure communication session with a first default I2C address 102 has been established, printer controller 60 may direct an "activate address" command to the first default I2C address 102 which includes a designated time duration. Upon receipt of the "activate address" command, logic circuitry package 20 is to not respond to commands directed to the corresponding first default I2C address 102 for the designated time duration, but to instead provide responses to commands directed to the corresponding second default I2C address 104, where such communication is non-authenticated communication (i.e., not cryptographically authenticated using component/master keys and MACs). In examples, commands directed to the second default I2C address 104 may include commands to read physical operating parameters associated with the corresponding one of print material containers 16*a* to 16*d* (e.g., a temperature, an ink level, and a pressure level). At the expiration of the designated time period, logic circuitry package 20 ceases responding to commands directed to the second default I2C address 104, and resumes the secure communications session for the corresponding first default I2C address 102.

As an illustrative example, after a secure communication session has been established with the first default I2C address 102 for cyan print material cartridge 16*b*, printer controller 60 may direct an "activate address" command to the first default I2C address 102 for cyan print material cartridge 16*b*, wherein the "activate address" command designates a time duration. Upon receipt of the "activate address" command, logic circuitry package 20 is configured to cease responding to commands directed to the corresponding first default I2C address 102 for cyan print material cartridge 16*b* for the designated time duration, and to instead to provide responses to commands directed to the second default I2C address 104 of cyan print material cartridge 16*b*.

In one example, the second default I2C address 104 of each print material cartridge 16*a* to 16*d* is a same I2C address. As such, in one example, in order to avoid potential conflict with the second default I2C address 104 of the remaining print material cartridges (16*a*, 16*c*, 16*d*), during the time duration, printer controller 60 directs a "change address" command to the second default 12C 104 address of cyan print material cartridge 16*b*, the command including a new second I2C address 104-1. In response to such "change address" command, logic circuitry package 20 sets the second default I2C address 104 for cyan print material cartridge 16b to the new second I2C address 104-1 and stores the new second default I2C address 104-1 in volatile memory 120 for the duration of the print job.

Thereafter, printer controller 60 may direct commands to the new second I2C address 104-1 of cyan print material cartridge 16b for the remainder of the designated time duration. In one example, printer controller 60 may direct a "read ink level" command to the new second I2C address 104-1 of cyan print material cartridge. In one example, logic circuitry package 20 maintains in nonvolatile memory 100 an estimated ink level value 110 for each first default I2C address. In one example, logic circuitry package 20 adjusts the estimated ink level for each first default I2C address based on factors such as the number of print sessions, and an accumulated duration of print sessions. In one example, logic circuitry package 20 reads an ink level from an ink level sensor disposed in one of the print material cartridges 16a to 16d, such as ink level sensor 111 in black print material cartridge 16a, and estimates from the black ink level an ink level for each of the remaining print material cartridges 16b to 16d (e.g., via corresponding look-up tables). Continuing with the above example, in response to the "read ink level" command directed to the new second default I2C address 104-1 of cyan print material cartridge 16b, logic circuitry package 20 provides a non-authenticated response message to printer controller 60 including the estimated ink level 110 as read from non-volatile memory 100.

In examples, printer controller 60 may monitor a status of each ink color as it is deposited onto print media 74 by printhead 72. In one example, based on such monitoring, when printer controller 60 detects that a particular color of ink has run out, printer controller 60 provides an "out-of-ink" indication to a user, directs a message to the first default I2C address corresponding to the particular color to provide notification to the print material cartridge 16 that it is out of ink, and treats the print material cartridge as being out of ink. In one example, in response to the "out-of-ink notification" command, logic circuitry package 20 sets an out-of-ink flag 112 in nonvolatile memory 100 for the corresponding first default I2C address.

Upon being powered-up for the next print job, logic circuitry package 20 assumes that the corresponding print material cartridge 16 has been replaced and resets the corresponding out-of-ink flag 112 and sets the corresponding estimated ink level value 110 to a value indicative of a "full" level, regardless of whether the corresponding print material cartridge 16 has been replaced. It is noted that since ink level value 110 and out-of-ink flag 112 are separate parameters, during a print job, ink level value 110 may indicate a non-zero ink level while the out-of-ink flag 112 indicates an out-of-ink condition, and vice-versa. Additionally, upon being powered-up for the next print job, logic circuitry package provides a new Unique ID 106 (such as from a look-up table in non-volatile memory 100) and generates new component keys 28 and component key identifiers 108 for the "new" print material cartridge 16.

In one example, where logic circuitry package 20 is disposed within black print material cartridge 16a, when printer controller 60 provides indication to a user and directs an "out-of-ink" message to the first default I2C address corresponding to black print material cartridge 16a, logic circuitry package 60 sets the out-of-ink flag bit in non-volatile memory 100 for the corresponding first default I2C address 102. Upon being powered-up for the next print job, logic circuitry package 20 assumes that black print material cartridge 16a has been replaced and resets the corresponding out-of-ink flag and sets the corresponding estimated ink level value 110 to a value indicative of a "full" level, regardless of whether the black print material cartridge 16a has replaced. When black print material cartridge 16a is replaced, the ink level values 110 corresponding to each of the print material cartridges 16a to 16d as stored in nonvolatile memory 100 of the logic circuitry package 20 of the replacement black print material cartridge 16a each have a value indicative of a "full" level, regardless of the actual ink level in print material cartridges 16b-16d.

In another case, continuing with the above example, during the time duration designated by the "activate address" command, printer controller 60 may direct a "read temperature" command to the new second I2C address 104-1 cyan print material cartridge 16b. In one example, logic circuitry package 20 maintains in nonvolatile memory 100 an estimated temperature value 114 for each first default I2C address 102. In one example, the estimated temperature value 114 for each first default I2C address 102 vary from one another and are incrementally greater than an expected ambient temperature. In one example, logic circuitry package 20 reads a temperature from a temperature sensor disposed in one of the print material cartridges 16a to 16d, such as a temperature sensor 115 in black print material cartridge 16a, and estimates from the measured temperature of black print material cartridge 16a a temperature level of each of the remaining print material cartridges (e.g., via corresponding look-up tables). Continuing with the above example, in response to the "read temperature" command directed to new second I2C address 104-1 of cyan print material cartridge 16b, logic circuitry package 20 provides a non-authenticated response message to printer controller 60 including the estimated temperature level 114 corresponding to cyan print material cartridge 16b as read from nonvolatile memory 100.

In another case, continuing with the above example, during the time duration designated by the "activate address" command, printer controller 60 may direct a "read pressure" command to the new second default IC address 104-1 of cyan print material cartridge 16b. In one example, logic circuitry package 20 reads a pressure level of a reservoir 90 via a pressure sensor disposed in one of the print material cartridges 16a to 16d, such as a pressure sensor 118 providing a pressure level of reservoir 90a in black print material cartridge 16a. In one example, logic circuitry package 20 estimates from the measured pressure level of black print material cartridge 16a a pressure level of each of the remaining print material cartridges 16b-16d, such as via corresponding look-up tables, where the estimated pressure levels corresponding to print material cartridges 16a to 16d are configured to vary slightly from one another and from the measured pressure level of black print material cartridge 16a. Continuing with the above example, in response to the "read pressure" command directed to new second default I2C address 104-1 of cyan print material cartridge 16b, logic circuitry package 20 provides a non-authenticated response message to printer controller 60 including the estimated pressure level of cyan print material cartridge 16b as based on the measured pressure level of black print material cartridge 16a.

It is noted that because printer controller 60 controls the pressure applied to the reservoirs 90a to 90d of print material cartridges 16a to 16d via shared pump 78, according to one example, at least one of the print material cartridges 16a to 16d must include a pressure sensor 118 from which logic circuitry package 20 is able to obtain a pressure level reading in order to provide estimated pressure levels for the remaining ones of the print material cartridges 16a to 16d. In other examples (not illustrated), in lieu of employing a pressure sensor in at least one of the print material cartridges 16a to 16d, logic circuitry package 20 could instead be configured to monitor pump 78. For example, logic circuitry package 20 may employ an inductive current sensor to determine when pump 78 is active, and may employ a strain gauge to monitor a pressure on the air line 79. Other suitable implementations may be employed to enable logic circuitry package 20 to monitor a pressure provided by pump 78, both with and without a pressure gauge 118 disposed within one of the print material cartridges 16a to 16d.

In other examples, printer controller 60 may direct a "slot detect" command to one of the first default I2C addresses 102 corresponding to one of the print material cartridges 16a to 16d, where the command instructs that the SDA line of serial data bus 80 be driven low for a time duration. Because each of the first default I2C addresses correspond to a different one of the cartridge slots 92a to 92d, and because a different series-connected resistance value is disposed in the SDA line between each of the cartridge slots 92a to 92d and printer controller 60 due to divider resistors 88a to 88d, printer controller 60 expects a different predetermined voltage level to be present at printer controller 60 for each of the first default I2C addresses as a result of the voltage signal of a known defined voltage level being placed on serial data bus 80 in response to the "slot detect" command. Thus, the resulting voltage at printer controller 60 from application of the voltage signal applied to the SDA line of serial data bus 80 in response to the "slot detect" command can be used by printer controller 60 to determine the cartridge slot 92a to 92d to which the first default I2C address designated by the "slot detect" command corresponds. For a given one of the first default I2C addresses 102 designated by the "slot detect" command, if the resulting voltage level at printer controller 60 matches the expected predetermined voltage level, the corresponding one of the print material cartridges 16a to 16d is deemed to be positioned in the proper one of carriage slots 92a to 92b.

In one example, with reference to FIG. 3, logic circuitry package includes a voltage control circuitry 130 configured to adjust a voltage level placed on the SDA line by logic circuitry package 20 based on the one of the first default I2C addresses 102 designated by the "slot detect" command such that the resulting voltage level on the SDA line at printer controller 60 matches the expected predetermined voltage level. In one example, when logic circuitry package 20 is disposed at cartridge slot 92a, either as part of print material cartridge 16a or separately from print material cartridge 16a (e.g., see FIG. 4), voltage control circuitry 130 may comprise a resistor network, where different resistor values may be selected by control logic 30 to be connected in series with divider resistor 88a depending on the one of the first default I2C addresses 102 designated by the "slot detect" command so that the resulting voltage at printer controller 60 matches the expected predetermined voltage level.

In other examples, where logic circuitry package 20 may be disposed both at cartridge slot 92a and at locations other than cartridge slot 92a, voltage control circuitry 130 may comprise a controllable voltage source controlled by control logic 30 so as to provide a voltage level at the connection point of voltage control circuitry 130 to the SDA line of serial data bus 80 depending on the one of the first default I2C addresses 102 designated by the "slot detect" command so that the resulting voltage at printer controller 60 matches the expected predetermined voltage level.

FIGS. 4A and 4B are block and schematic diagrams generally illustrating logic circuitry package including a flexible wiring substrate 140 for connecting the logic circuitry package 20 to serial data bus 80, according to one example. In particular, FIGS. 4A and 4B are cross-sectional views through a portion of cartridge slot 92a and print material cartridge 16a.

With reference to FIG. 4A, contact 94a-1 represents an individual contact of cartridge slot contacts 94a (see FIG. 2) connected to the SDA line of serial data bus 80, and contact 96a-1 represents a corresponding individual contact of cartridge contacts 96a of print material cartridge 16a. In one example, logic circuitry package 20 is disposed on a first surface 142 of a flexible substrate 140 along with a contact 144-1 corresponding to contact 94a-1. A contact 146-1 corresponding to contact 96a-1 is disposed on an opposing second surface 143 of flexible substrate 140. A conductive via 148-1 extends through flexible substrate 140 between first surface 142 and opposing second surface 143. Logic circuitry package 20 is connected to contact 144-1 by a conductive trace 150-1 to thereby interrupt and route the SDA line of serial data bus 80 to logic circuitry package 20. Conductive traces 148-1 and 154-1, by way of via 148-1, connect logic circuitry package 20 contact 146-1, which in-turn, connect to contact 96a-1 to thereby connect logic circuitry package 20 to pressure sensor 118 within print material cartridge 16a.

FIG. 4B generally illustrates an example logic circuitry package 20 being connected in parallel with print material cartridge 16a to the Vdd, SCL, and GND lines of serial data bus 80. A contact 144 on first surface 142 connects to a corresponding contact 94 of cartridge slot 92a, and a contact on 146 on opposing second surface 143 connects to a corresponding contact 96 of print material cartridge 16a. A via 148 extending through flexible substrate 140 from first surface 142 to second surface 143 connects contact 144 to contact 146, and a conductive trace 150 connects logic circuitry package 20 with contact 144 such that logic circuitry package 20 and print material cartridge 16a are connected in parallel to Vdd, SCL, and GND lines of serial data bus 80. It is noted that such arrangement is repeated for each of the Vdd, SCL, and GND lines of serial data bus 80.

Although described primarily in terms of replaceable print material cartridges 16a to 16d, it is noted that logic circuitry package 20 may respond to messages directed to addresses corresponding to any number of different types of replaceable print apparatus component other than print material cartridges.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A logic circuitry package for a print apparatus comprising:
   a serial data bus interface to interface with a serial data bus, the logic circuit to respond to messages from the print apparatus over the serial data bus directed to a number of different addresses using different component keys for cryptographic authentication corresponding to each different address, the different component keys related to at least one master key of the print apparatus and calculated for each different address from the at least one master key and based on a unique ID associated with each of the different addresses; and control logic, in response to a session initiation request message on the serial data bus from the print apparatus to establish a secure communication session related to one of the different addresses, the control logic to cryptographically authenticate responses to each subsequent message of the secure communication session from the print apparatus using a component key corresponding to the address.

2. The logic circuitry package of claim 1, where the logic circuitry package is a single package component with a single data contact to interface with the serial data bus, configured to transmit the messages to the different addresses, and the responses to those messages, over the single data contact.

3. The logic circuitry package of claim 1, for each of the different addresses, in response to receiving a session initiation request message to establish a secure communication session with the address, the logic circuit to:

generate a component session key and a component session key identifier related to a component key corresponding to the address; and provide a session response message on the serial data bus including the component session key identifier.

4. The logic circuitry package of claim 3, for each of the different addresses, after receiving the session initiation request message to establish the secure communication session, in response receiving an authenticated request message directed to the address, the authenticated request message including a first message authentication code related to a master session key associated with the master key and the component session key identifier, the logic circuit to:

generate a second message authentication code related to the component session key and to the first message authentication code; and provide a cryptographically authenticated response message including response data and the second message authentication code.

5. The logic circuitry package of claim 4, when the authenticated request message comprises a read request for print data, the logic circuit to provide response data comprising print data related to print data identified by the read request.

6. The logic circuitry package of claim 4, when the authenticated request message comprises a write request including print data, the logic circuit to store the print data.

7. The logic circuitry package of claim 1, including a memory, the memory to store:

the number of different addresses, each address corresponding to a different replaceable print component of the print apparatus, and operating data corresponding to each of the different addresses, the operating data including a number of component keys.

8. The logic circuitry package of claim 1, the serial data bus interface comprising an I2C serial data bus interface such that the different addresses comprise I2C addresses the different addresses including at least four different default I2C addresses, each of the four different default I2C addresses having a corresponding further default I2C address, in response to an activate address command on the serial data bus directed to one of the four default addresses, the logic circuitry package to respond to messages directed to the further default I2C address and to suspend responding to messages directed to the one of the four default I2C addresses for a time duration specified in the activate address command.

9. The logic circuitry package of claim 8, during the time duration, in response to a change address command on the serial data bus directed to the further default I2C address, the logic circuitry package to:

change the further default I2C address to a new I2C address designated by the change address command;

provide non-cryptographically authenticated responses to messages from the print apparatus on the serial data bus directed to the new I2C address for a remainder of the time duration; and respond once again to the one of the different default I2C address after the time duration.

10. The logic circuitry package of claim 1, where each of the number of different addresses has a number of corresponding parameters including the unique ID representative of an ID of a corresponding replaceable print component, an ink level, and a page count.

11. A replaceable print material cartridge for a print apparatus, comprising:

a print material reservoir; and a logic circuitry package including:

a serial data bus interface to interface with a serial data bus, the logic circuitry package to respond to messages on the serial data bus from the print apparatus directed to a number of different addresses using different component keys corresponding to each different address, the different component keys related to at least one master key of the print apparatus and, pre-calculated for each different address from the at least one master key and based on a unique ID associated with each of the different addresses, a first one of the different addresses corresponding to the replaceable print material cartridge and each of the remaining different addresses corresponding to a different one of a number of additional replaceable print material cartridges; and control logic, in response to a session initiation request message on the serial data bus from the print apparatus to establish a secure communication session with one of the different addresses, to cryptographically authenticate responses to each subsequent message of the secure communication session from the print apparatus using a corresponding component key corresponding to the address.

12. The replaceable print material cartridge of claim 11, for each of the different addresses, in response to receiving a session initiation request message to establish a secure communication session with the address, the logic circuit to:

generate a component session key and a component session key identifier related to a component key corresponding to the address; and provide a session response message on the serial data bus including the component session key identifier.

13. The replaceable print material cartridge of claim 12, for each of the different addresses, after receiving the session initiation request message to establish the secure communication session, in response receiving an authenticated request message directed to the address, the authenticated request message including a first message authentication code related to a master session key associated with the master key and the component session key identifier, the logic circuit to:

generate a second message authentication code related to the component session key and to the first message authentication code; and provide a cryptographically authenticated response message including response data and the second message authentication code.

14. The replaceable print material cartridge of claim 11, each of the number of different addresses being a different first default I2C address, and each of the different first default I2C addresses having a corresponding second default I2C address, in response to an activate address command on the serial data bus directed to one of the first default I2C addresses, the logic circuitry package to respond to messages directed to the corresponding second default I2C address and to suspend responding to messages directed to the one of the first default I2C addresses for a time duration specified by the activate address command.

15. The replaceable print material cartridge of claim 14, during the time duration, in response to a change address command on the serial data bus directed to the second default I2C address, the logic circuitry package to:

change the second default I2C address to a new I2C address designated by the change address command;

provide non-cryptographically authenticated responses to messages from the print apparatus on the serial data bus directed to the new I2C address for a remainder of the time duration; and respond once again to the one of the first default I2C addresses after the time duration.

16. The replaceable print material cartridge of claim 15, further including a pressure sensor to measure a pressure level of the print material reservoir, where the one of the first default I2C addresses corresponds to the print material cartridge, in response to a measure pressure command directed to the new I2C address, the control logic to obtain a measured pressure level from the pressure sensor and to provide the measured pressure level in a response message.

17. The logic circuitry package of claim 16, where the one of the first default I2C addresses corresponds to one of the number of additional replaceable print material cartridges, in response to a measure pressure level command directed to the new I2C address, the control logic to prove an estimated pressure level in a response message, the estimated pressure level based on a measured pressure level from the pressure sensor.

18. A logic circuitry package for a print apparatus, comprising:

an I2C serial data bus interface to interface with an I2C serial data bus, the logic circuit to respond to messages from the print apparatus over the serial data bus directed to four first default I2C addresses using different component keys for cryptographic authentication corresponding to each of the four first default I2C addresses, the different component keys related to at least one master key of the print apparatus and calculated for each different address from the at least one master key and based on a unique ID associated with each of the different addresses, and each of the four first default I2C addresses corresponding to a different replaceable ink cartridge; and control logic, in response to a session initiation request message on the serial data bus from the print apparatus to establish a secure communication session with one of four first default I2C addresses, the control logic to cryptographically authenticate responses to each subsequent message of the secure communication session from the print apparatus using a component key corresponding to the one of the four first default I2C addresses.

19. The logic circuitry package of claim 18, for each of the different four first default I2C addresses, in response to receiving a session initiation request message to establish a secure communication session with the address, the logic circuit to:

generate a component session key and a component session key identifier related to a component key corresponding to the address; and provide a session response message on the serial data bus including the component session key identifier, for each of the different four first default I2C addresses, after receiving the session initiation request message to establish the secure communication session, in response receiving an authenticated request message directed to the address, the authenticated request message including a first message authentication code related to a print session key associated with the master key and the component session key identifier, the logic circuit to:

generate a second message authentication code related to the component session key and to the first message authentication code; and provide a cryptographically authenticated response message including response data and the second message authentication code.

20. The logic circuitry package of claim 18, each of the different four first default I2C addresses having a corresponding second default I2C address, in response to an activate address command on the serial data bus directed to one of the first default I2C addresses, the logic circuitry package to respond to messages directed to the corresponding second default I2C address and to suspend responding to messages directed to the one of the first default I2C addresses for a time duration specified by the activate address command, during the time duration, in response to a change address command on the serial data bus directed to the second default I2C address, the logic circuitry package to:

change the second default I2C address to a new I2C address designated by the change address command;

provide non-cryptographically authenticated responses to messages from the print apparatus on the serial data bus directed to the new I2C address for a remainder of the time duration; and respond once again to the one of the first default I2C addresses after the time duration.

* * * * *